(12) United States Patent
Zhou et al.

(10) Patent No.: US 12,124,006 B2
(45) Date of Patent: Oct. 22, 2024

(54) CAMERA LENS GROUP

(71) Applicant: ZHEJIANG SUNNY OPTICS CO., LTD., Yuyao Zhejiang (CN)

(72) Inventors: Jin Zhou, Yuyao Zhejiang (CN); Jianke Wenren, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 584 days.

(21) Appl. No.: 17/199,584

(22) Filed: Mar. 12, 2021

(65) Prior Publication Data

US 2022/0137365 A1    May 5, 2022

(30) Foreign Application Priority Data

Oct. 29, 2020   (CN) .......................... 202011180546.1

(51) Int. Cl.
*G02B 13/18*        (2006.01)
*G02B 9/62*         (2006.01)
(Continued)

(52) U.S. Cl.
CPC ........... *G02B 13/0045* (2013.01); *G02B 9/62* (2013.01); *G02B 27/0025* (2013.01)

(58) Field of Classification Search
CPC . G02B 9/00; G02B 9/62; G02B 13/00; G02B 13/001; G02B 13/0015;
(Continued)

(56) References Cited

U.S. PATENT DOCUMENTS 9,383,552 B2 *   7/2016   Liao .......................... G02B 9/62
9,513,465 B2 *  12/2016   Hsu ..................... G02B 13/0015
(Continued)

FOREIGN PATENT DOCUMENTS

| CN | 106990511 A | 7/2017 |
| EP | 3 064 976 B1 | 6/2020 |
| WO | 2019/205821 A | 10/2019 |

OTHER PUBLICATIONS

India First Examination Report issued Jun. 7, 2022, in connection with Indian Application No. 202114010136.

*Primary Examiner* — Thong Q Nguyen
(74) *Attorney, Agent, or Firm* — Norris McLaughlin, P.A.

(57) ABSTRACT

A camera lens group including, sequentially from an object side to an image side along an optical axis, a first lens having negative refractive power, a concave object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having positive refractive power and a convex image-side surface; and a sixth lens having negative refractive power, a convex object-side surface and a concave image-side surface. Half of a field-of-view Semi-FOV of the camera lens group and half of a diagonal length ImgH of an effective pixel area on an imaging plane satisfy: 10.00 mm<$\tan^2$(Semi-FOV)*ImgH<23.50 mm. A maximum distortion of the camera lens group is less than 3.50%.

20 Claims, 9 Drawing Sheets

(51) Int. Cl.
*G02B 13/00* (2006.01)
*G02B 27/00* (2006.01)

(58) Field of Classification Search
CPC .......... G02B 13/002; G02B 13/0045; G02B 13/008; G02B 13/14; G02B 13/143; G02B 13/146; G02B 13/18
USPC .................. 359/713, 756, 761, 714
See application file for complete search history.

(56) References Cited

U.S. PATENT DOCUMENTS

| | | | |
|---|---|---|---|
| 10,302,908 B2 * | 5/2019 | Tang | G02B 13/0045 |
| 10,317,646 B2 * | 6/2019 | Lin | G02B 9/62 |
| 11,320,632 B2 * | 5/2022 | Jung | H04N 23/45 |
| 11,747,593 B2 * | 9/2023 | Jhang | G02B 13/0045 359/713 |
| 2018/0239117 A1 | 8/2018 | Lee et al. | |

\* cited by examiner

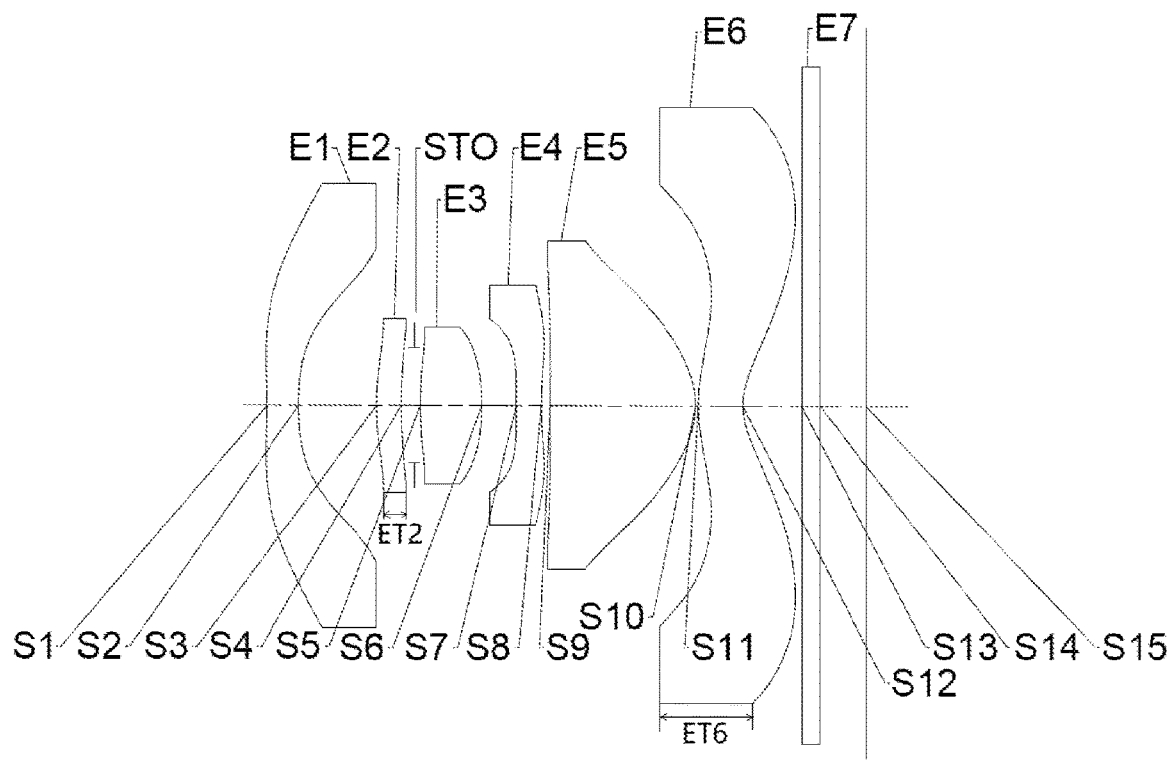
Fig. 1
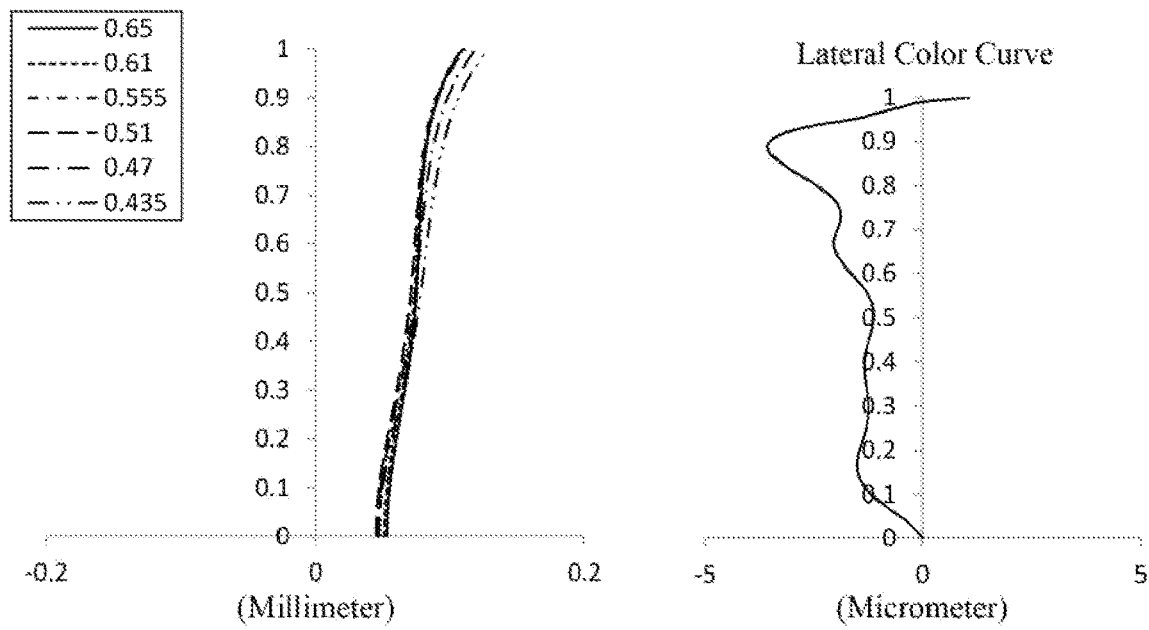
Fig. 2A
Fig. 2B

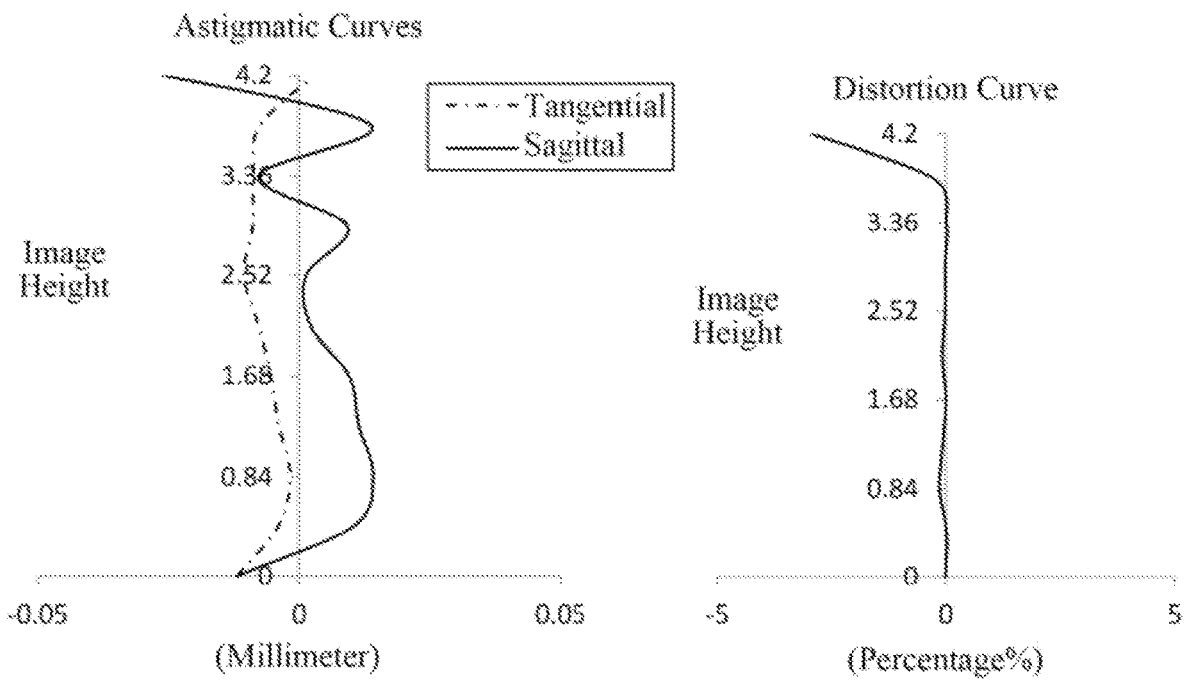
Fig. 2C
Fig. 2D
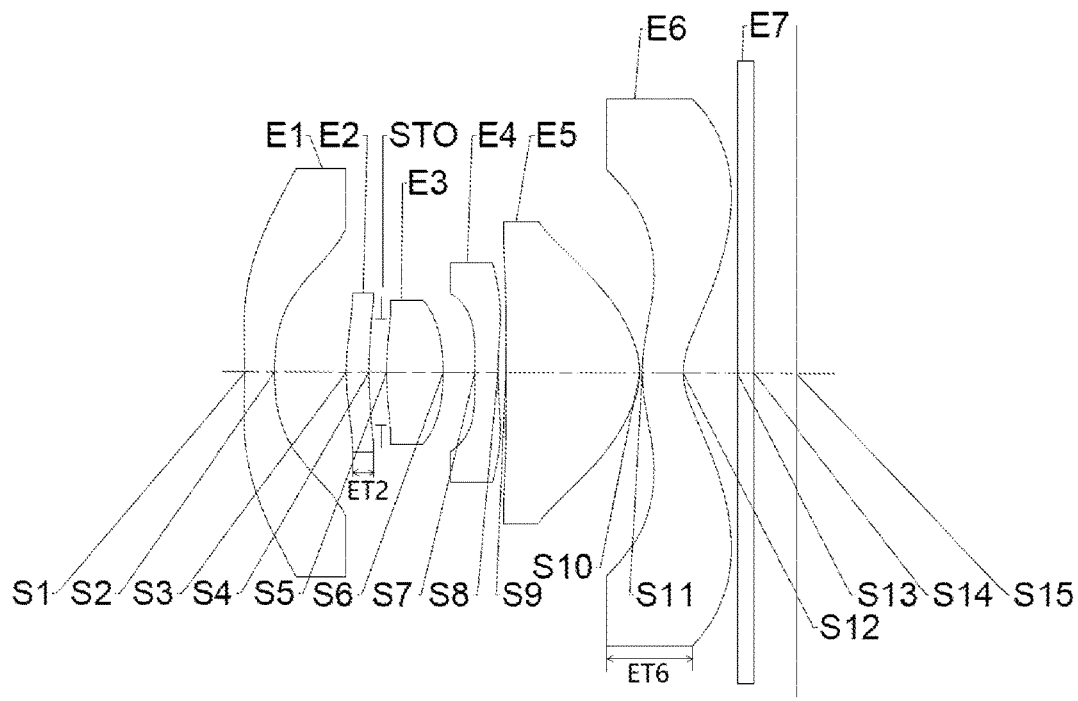
Fig. 3

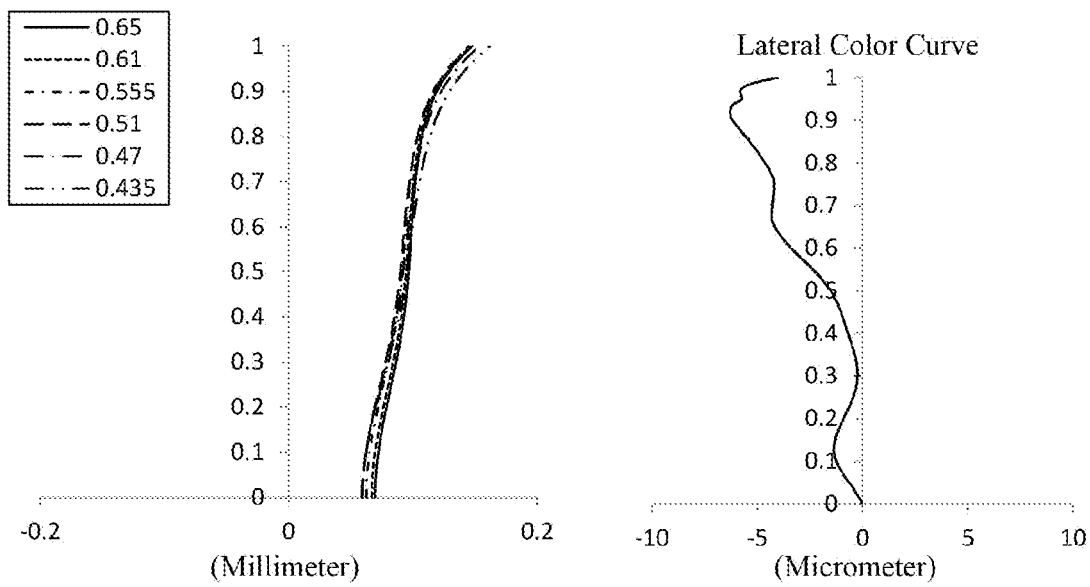
Fig. 4A
Fig. 4B
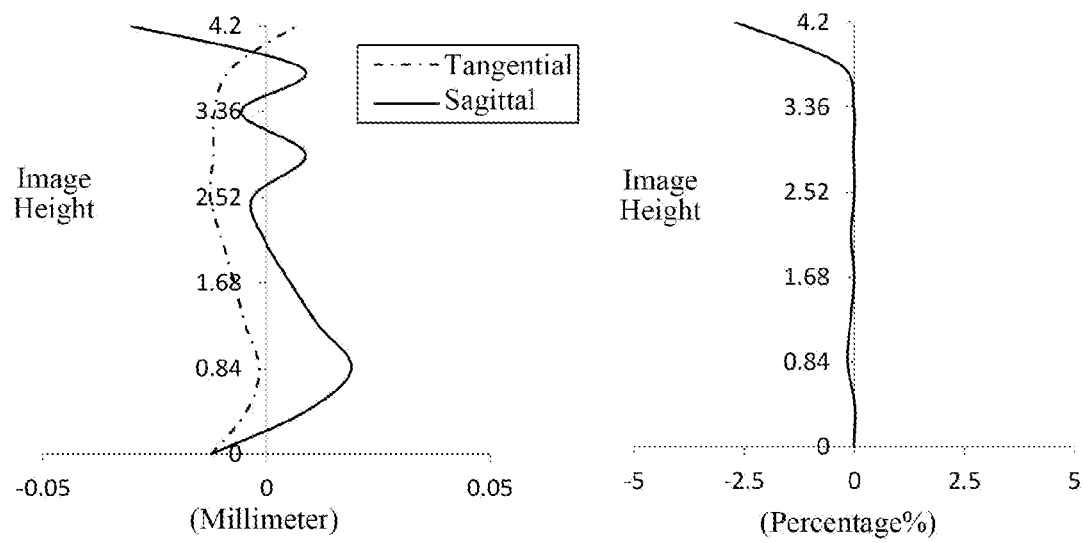
Fig. 4C
Fig. 4D

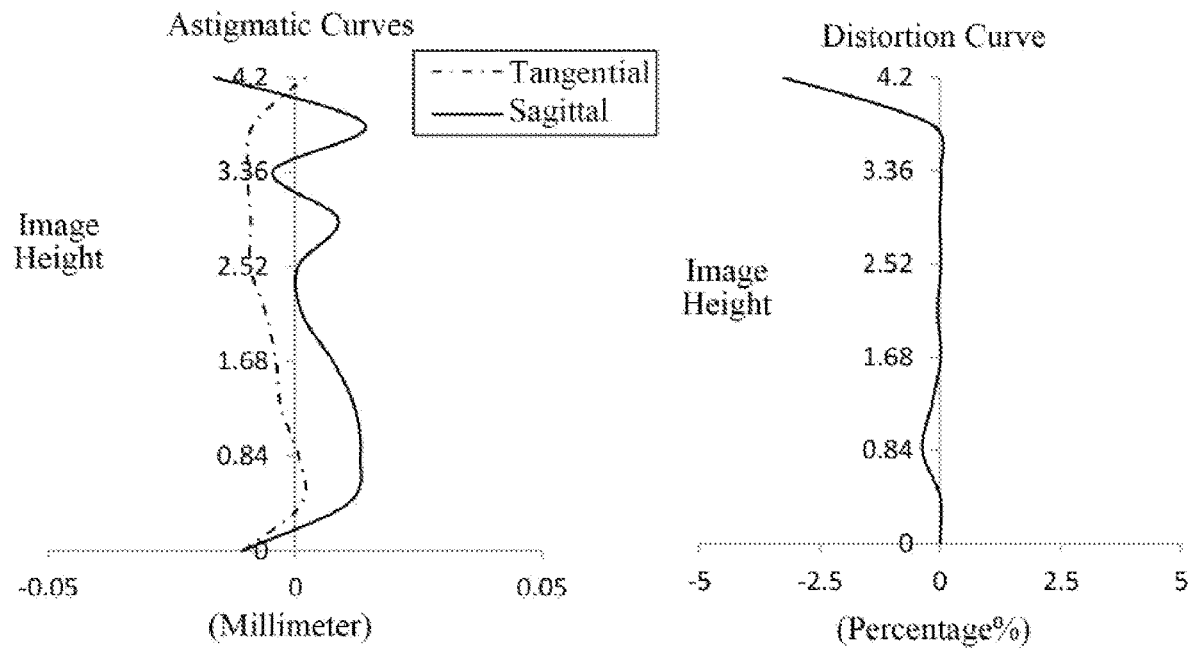
Fig. 6C
Fig. 6D
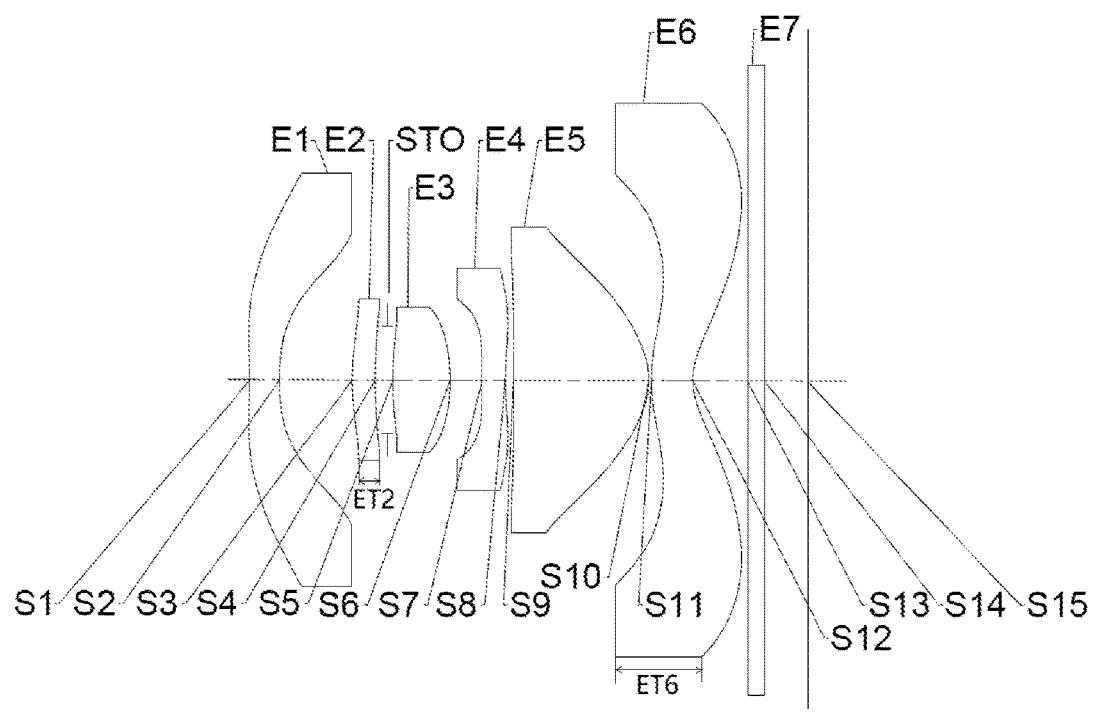
Fig. 7

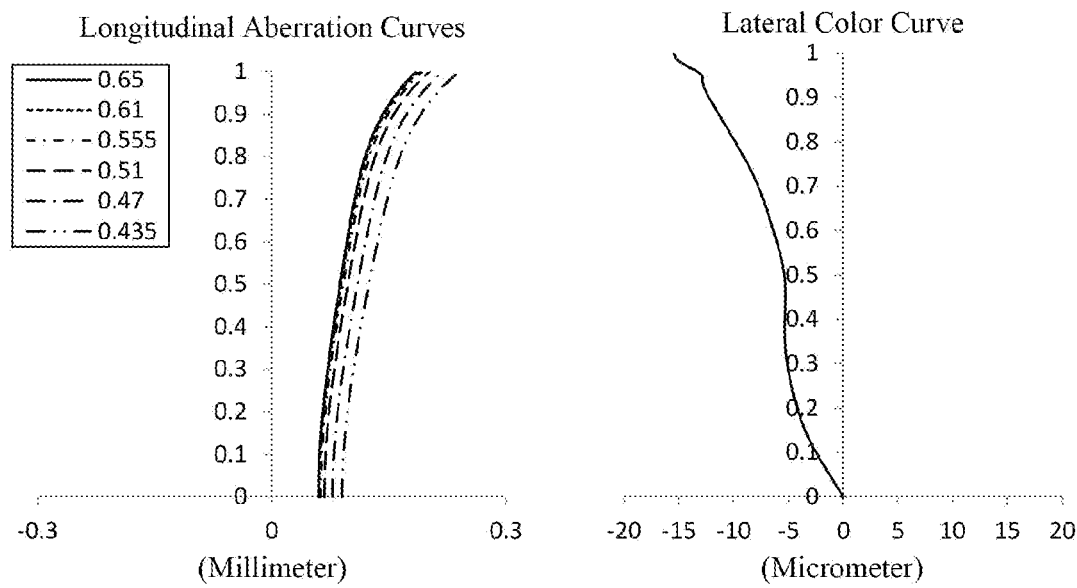
Fig. 8A
Fig. 8B
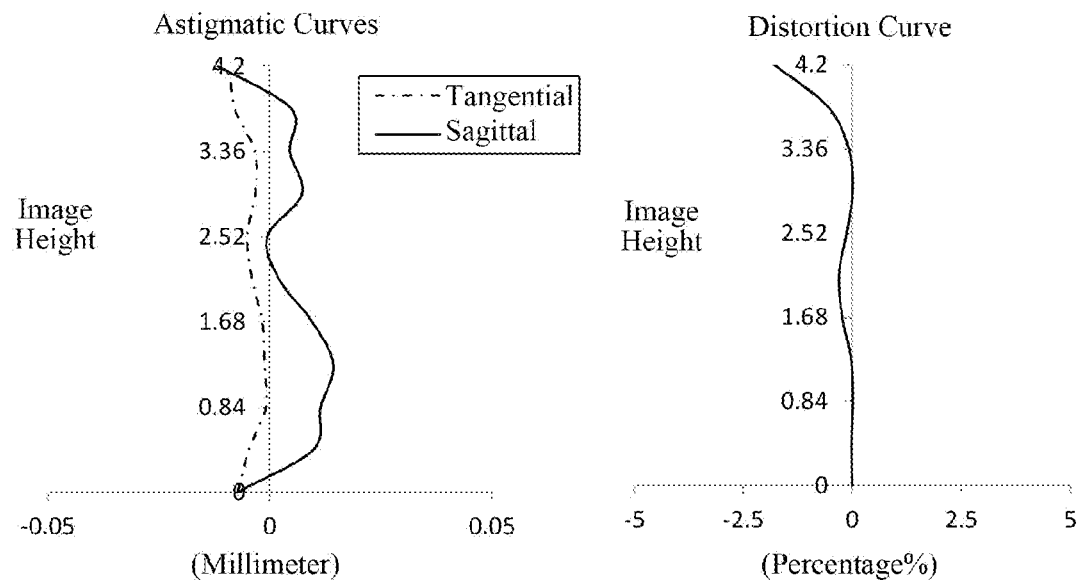
Fig. 8C
Fig. 8D

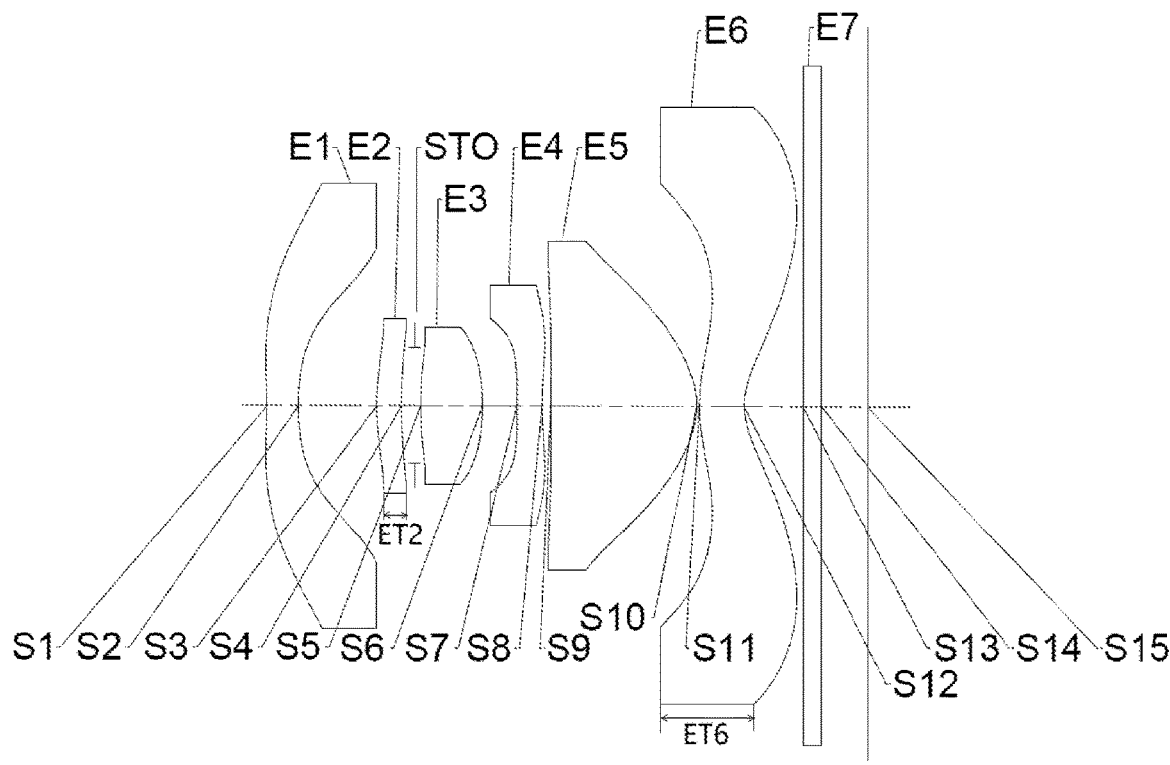
Fig. 9
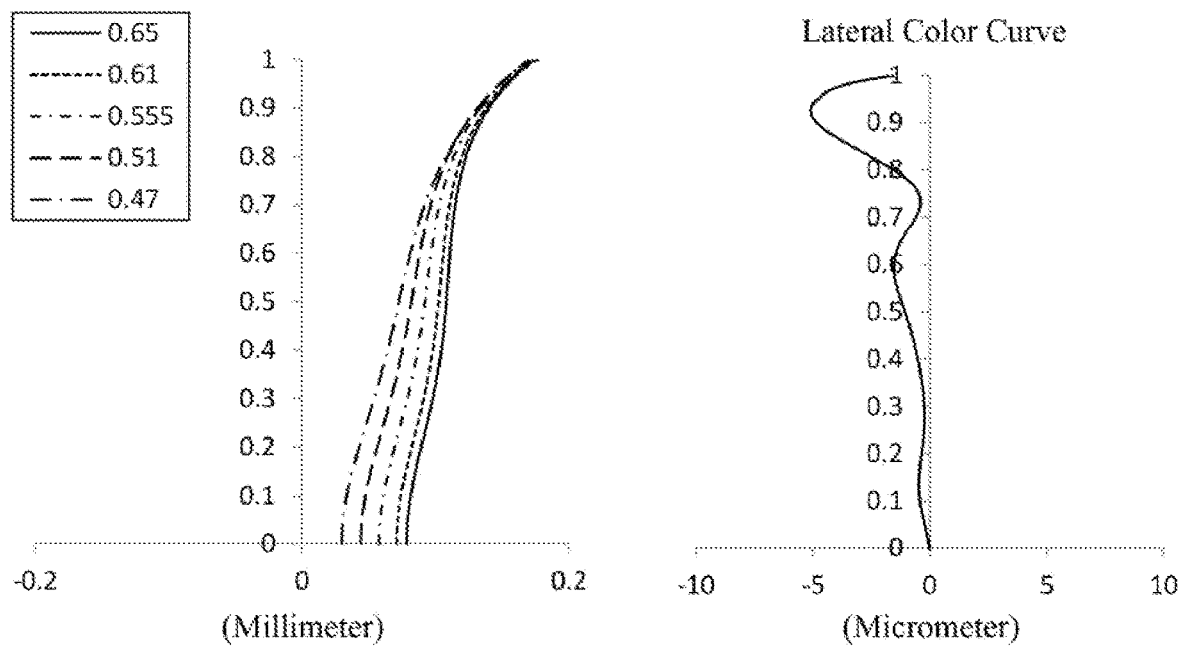
Fig. 10A
Fig. 10B

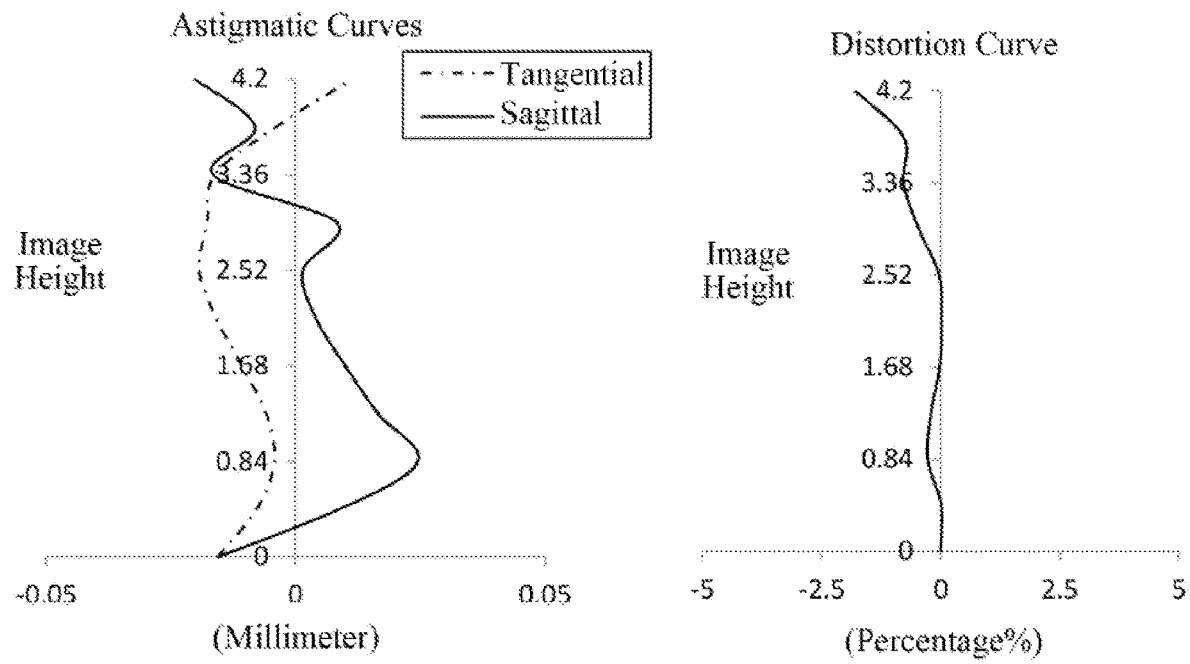
Fig. 10C
Fig. 10D
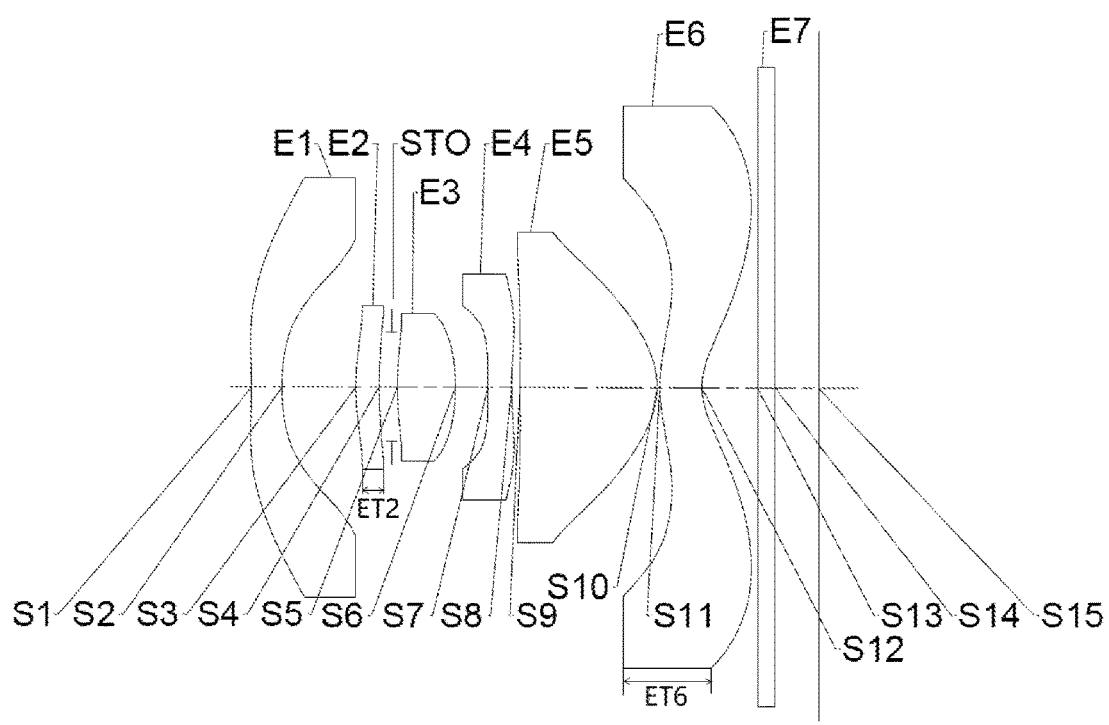
Fig. 11

CAMERA LENS GROUP

CROSS-REFERENCE TO RELATED APPLICATION

This application claims benefit of priority to Chinese Patent Application No. 202011180546.1 filed on Oct. 29, 2020 before the China National Intellectual Property Administration, the entire disclosure of which is incorporated herein by reference in its entity.

TECHNICAL FIELD

The present disclosure relates to the field of optical elements, and more specifically, relates to a camera lens group.

BACKGROUND

With the rapid development of science and technology, portable smart devices represented by mobile phones are becoming more and more popular, and people's interest and demand for using mobile phones to take photos or videos are also increasing. With the continuous development of the lens assemblies applicable to the mobile phone, it is an inevitable trend that high-quality camera phones replace cameras.

One advantage of mobile phone over camera is that the lens assembly applicable to the mobile phone has developed to dual-camera, triple-camera, quad-camera or even five-camera, and combined with algorithms to improve image quality. The current mainstream lens assembly applicable to the mobile phone generally includes large image plane lens assembly, telephoto lens assembly, and wide-angle lens assembly. The wide-angle lens assembly has a short focal length but a large viewing angle. At the same shooting distance, the wide-angle lens assembly may capture a larger area of the scene, but there is a relatively serious perspective distortion, which increases the sense of the distance between the front and back. Even if the auxiliary algorithm is corrected, it is difficult to solve the distortion problem.

Therefore, it is still expected to better overcome the problems existing in the original images captured by the traditional wide-angle camera lens group.

SUMMARY

The present disclosure provides a camera lens group which includes, sequentially from an object side to an image side along an optical axis, a first lens having negative refractive power, a concave object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having positive refractive power and a convex image-side surface; and a sixth lens having negative refractive power, a convex object-side surface and a concave image-side surface. Half of a field-of-view Semi-FOV of the camera lens group and half of a diagonal length ImgH of an effective pixel area on an imaging plane of the camera lens group may satisfy: 10.00 mm<$\tan^2$(Semi-FOV)*ImgH<23.50 mm. A maximum distortion of the camera lens group is less than 3.50%.

In one embodiment, at least one of the object-side surface of the first lens to the image-side surface of the sixth lens is aspheric.

In one embodiment, a distance TTL along the optical axis from the object-side surface of the first lens to the imaging plane of the camera lens group and half of the diagonal length ImgH of the effective pixel area on the imaging plane may satisfy: TTL/ImgH≤1.61.

In one embodiment, an effective focal length f1 of the first lens and an effective focal length f6 of the sixth lens may satisfy: 1.50<f1/f6<3.50.

In one embodiment, a combined focal length f34 of the third lens and the fourth lens and a distance BFL from the image-side surface of the sixth lens to the imaging plane of the camera lens group along the optical axis may satisfy: 2.00<f34/BFL<6.00.

In one embodiment, a radius of curvature R11 of the object-side surface of the sixth lens and a radius of curvature R12 of the image-side surface of the sixth lens may satisfy: 2.00<R11/R12<5.00.

In one embodiment, a radius of curvature R2 of the image-side surface of the first lens and a radius of curvature R3 of the object-side surface of the second lens may satisfy: 1.00<R2/R3<2.50.

In one embodiment, a center thickness CT5 of the fifth lens along the optical axis and a spaced interval T56 between the fifth lens and the sixth lens along the optical axis may satisfy: 29.00<CT5/T56<55.00.

In one embodiment, a center thickness CT1 of the first lens along the optical axis and a center thickness CT3 of the third lens along the optical axis may satisfy: 2.00<(CT3+CT1)/(CT3−CT1)<4.00.

In one embodiment, SAG41, being an on-axis distance from an intersection of an object-side surface of the fourth lens and the optical axis to a vertex of an effective radius of the object-side surface of the fourth lens, and SAG42, being an on-axis distance from an intersection of an image-side surface of the fourth lens and the optical axis to a vertex of an effective radius of the image-side surface of the fourth lens, may satisfy: 0.50<(SAG41+SAG42)/(SAG41−SAG42)<3.00.

In one embodiment, a maximum effective radius DT61 of the object-side surface of the sixth lens and a maximum effective radius DT62 of the image-side surface of the sixth lens may satisfy: 4.00<(DT61+DT62)/(DT62−DT61)<10.00.

In one embodiment, an edge thickness ET2 of the second lens and an edge thickness ET6 of the sixth lens may satisfy: 3.00<ET6/ET2<6.00.

In another aspect, the present disclosure provides a camera lens group which includes, sequentially from an object side to an image side along an optical axis, a first lens having negative refractive power, a concave object-side surface and a concave image-side surface; a second lens having refractive power, a convex object-side surface and a concave image-side surface; a third lens having positive refractive power, a convex object-side surface and a convex image-side surface; a fourth lens having refractive power; a fifth lens having positive refractive power and a convex image-side surface; and a sixth lens having negative refractive power, a convex object-side surface and a concave image-side surface. A center thickness CT1 of the first lens along the optical axis and a center thickness CT3 of the third lens along the optical axis may satisfy: 2.00<(CT3+CT1)/(CT3−CT1)<4.00. A maximum distortion of the camera lens group is less than 3.50%.

In one embodiment, a distance TTL along the optical axis from the object-side surface of the first lens to an imaging plane of the camera lens group and half of a diagonal length ImgH of an effective pixel area on the imaging plane may satisfy: TTL/ImgH≤1.61.

In one embodiment, an effective focal length f1 of the first lens and an effective focal length f6 of the sixth lens may satisfy: 1.50<f1/f6<3.50.

In one embodiment, a combined focal length f34 of the third lens and the fourth lens and a distance BFL from the image-side surface of the sixth lens to an imaging plane of the camera lens group along the optical axis may satisfy: 2.00<f34/BFL<6.00.

In one embodiment, a radius of curvature R11 of the object-side surface of the sixth lens and a radius of curvature R12 of the image-side surface of the sixth lens may satisfy: 2.00<R11/R12<5.00.

In one embodiment, a radius of curvature R2 of the image-side surface of the first lens and a radius of curvature R3 of the object-side surface of the second lens may satisfy: 1.00<R2/R3<2.50.

In one embodiment, a center thickness CT5 of the fifth lens along the optical axis and a spaced interval T56 between the fifth lens and the sixth lens along the optical axis may satisfy: 29.00<CT5/T56<55.00.

In one embodiment, half of a field-of-view Semi-FOV of the camera lens group and half of a diagonal length ImgH of an effective pixel area on an imaging plane of the camera lens group may satisfy: 10.00 mm<$\tan^2$(Semi-FOV)*ImgH<23.50 mm.

In one embodiment, SAG41, being an on-axis distance from an intersection of an object-side surface of the fourth lens and the optical axis to a vertex of an effective radius of the object-side surface of the fourth lens, and SAG42, being an on-axis distance from an intersection of an image-side surface of the fourth lens and the optical axis to a vertex of an effective radius of the image-side surface of the fourth lens, may satisfy: 0.50<(SAG41+SAG42)/(SAG41−SAG42)<3.00.

In one embodiment, a maximum effective radius DT61 of the object-side surface of the sixth lens and a maximum effective radius DT62 of the image-side surface of the sixth lens may satisfy: 4.00<(DT61+DT62)/(DT62−DT61)<10.00.

In one embodiment, an edge thickness ET2 of the second lens and an edge thickness ET6 of the sixth lens may satisfy: 3.00<ET6/ET2<6.00.

The present disclosure employs six lenses, and the camera lens group has at least one beneficial effect, such as miniaturization, wide-angle, small distortion, and good image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of a camera lens group according to example 1 of the present disclosure; and FIGS. 2A to 2D illustrate longitudinal aberration curves, a lateral color curve, astigmatic curves, and a distortion curve of the camera lens group of the example 1, respectively.

FIG. 3 illustrates a schematic structural view of a camera lens group according to example 2 of the present disclosure; and FIGS. 4A to 4D illustrate longitudinal aberration curves, a lateral color curve, astigmatic curves, and a distortion curve of the camera lens group of the example 2, respectively.

FIGS. 6A to 6D illustrate longitudinal aberration curves, a lateral color curve, astigmatic curves, and a distortion curve of the camera lens group of the example 3, respectively.

FIG. 7 illustrates a schematic structural view of a camera lens group according to example 4 of the present disclosure; and FIGS. 8A to 8D illustrate longitudinal aberration curves, a lateral color curve, astigmatic curves, and a distortion curve of the camera lens group of the example 4, respectively.

FIG. 9 illustrates a schematic structural view of a camera lens group according to example 5 of the present disclosure; and FIGS. 10A to 10D illustrate longitudinal aberration curves, a lateral color curve, astigmatic curves, and a distortion curve of the camera lens group of the example 5, respectively.

FIG. 11 illustrates a schematic structural view of a camera lens group according to example 6 of the present disclosure.

DETAILED DESCRIPTION OF EMBODIMENTS

Figure 5:
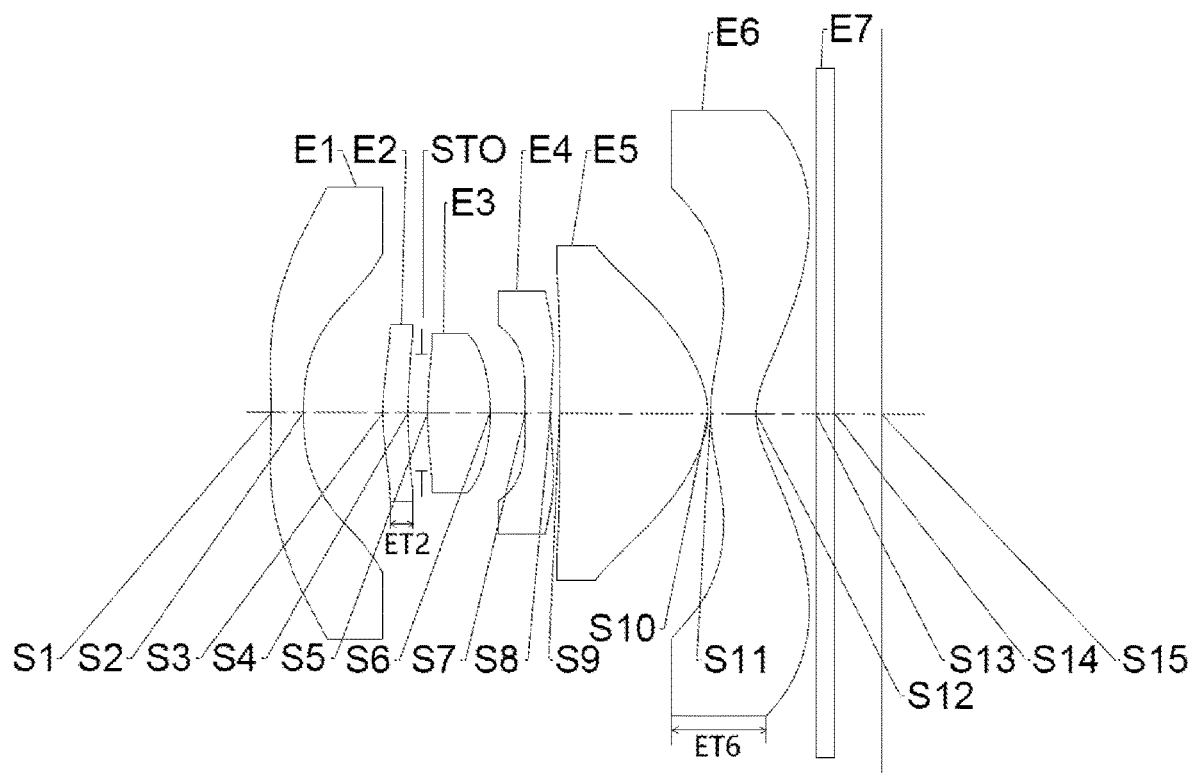
FIG. 5 illustrates a schematic structural view of a camera lens group according to example 3 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include, for example, six lenses having refractive power, that is, a first lens, a second lens, a third lens, a fourth lens, a fifth lens and a sixth lens. The six lenses are arranged sequentially from an object side to an image side along an optical axis. Among the first lens to the sixth lens, there may be an air interval between each two adjacent lenses.

In an exemplary embodiment, the first lens may have negative refractive power, an object-side surface thereof may be concave, and an image-side surface thereof may be concave. The second lens may have positive or negative refractive power, an object-side surface thereof may be convex, and an image-side surface thereof may be concave. The third lens may have positive refractive power, an object-side surface thereof may be convex, and an image-side surface thereof may be convex. The fourth lens may have positive or negative refractive power. The fifth lens may have positive refractive power, and an image-side surface thereof may be convex. The sixth lens may have negative refractive power, an object-side surface thereof may be convex, and an image-side surface thereof may be concave. By reasonably controlling the refractive power and surface curvature of each lens of the camera lens group, the aberration of the camera lens group may be effectively compensated.

In an exemplary embodiment, a maximum distortion of the camera lens group of the present disclosure is less than 3.50%. The camera lens group of the present disclosure has small distortion, and the image quality of the camera lens group is high. The image formed by the camera lens group is close to the real scene.

In an exemplary embodiment, the camera lens group according to the present disclosure may satisfy: 10.00 mm<$\tan^2$(Semi-FOV)*ImgH<23.50 mm, where Semi-FOV is half of a field-of-view of the camera lens group, and ImgH is half of a diagonal length of an effective pixel area on an imaging plane of the camera lens group. When the camera lens group satisfies 10.00 mm<$\tan^2$(Semi-FOV)*ImgH<23.50 mm, a relatively large field-of-view may be obtained, so that the camera lens group has a relatively wide imaging range. More specifically, Semi-FOV and ImgH may satisfy: 10.05 mm<$\tan^2$(Semi-FOV)*ImgH<23.10 mm.

In an exemplary embodiment, the camera lens group according to the present disclosure may satisfy: TTL/ImgH≤1.61, where TTL is a distance along the optical axis from the object-side surface of the first lens to an imaging plane of the camera lens group, and ImgH is half of a diagonal length of an effective pixel area on the imaging plane. The camera lens group satisfies TTL/ImgH≤1.61, which may reduce the overall length of the camera lens group to achieve ultra-thin characteristics. The camera lens group may be applied to various electronic devices that have a tendency to become thinner. More specifically, TTL and ImgH may satisfy: 1.50≤TTL/ImgH≤1.61.

In an exemplary embodiment, the camera lens group according to the present disclosure may satisfy: 1.50<f1/f6<3.50, where f1 is an effective focal length of the first lens, and f6 is an effective focal length of the sixth lens. On the one hand, if the ratio of the effective focal lengths of the first lens and the sixth lens satisfies the expression, it is beneficial to reduce the sensitivity of the two lenses, thereby making the camera lens assembly more stable in use. On the other hand, it is beneficial to control the contribution of the two lenses to the aberration within a reasonable range, so as to correct the aberration of the camera lens group, thereby making the camera lens group have high image quality. In addition, it may make the two lenses easier to process. More specifically, f1 and f6 may satisfy: 1.80<f1/f6<3.10.

In an exemplary embodiment, the camera lens group according to the present disclosure may satisfy: 2.00<f34/BFL<6.00, where f34 is a combined focal length of the third lens and the fourth lens, and BFL is a distance from the image-side surface of the sixth lens to an imaging plane of the camera lens group along the optical axis. The camera lens group satisfies 2.00<f34/BFL<6.00, which may make the camera lens group have good processability, and at the same time ensure the camera lens group have better image quality. More specifically, f34 and BFL may satisfy: 2.50<f34/BFL<5.80.

In an exemplary embodiment, the camera lens group according to the present disclosure may satisfy: 2.00<R11/R12<5.00, where R11 is a radius of curvature of the object-side surface of the sixth lens, and R12 is a radius of curvature of the image-side surface of the sixth lens. The camera lens group satisfies 2.00<R11/R12<5.00. On the one hand, the formation of image blur is avoided, so that the camera lens group may obtain higher image quality. On the other hand, satisfying the above conditional expression may avoid welding marks formed on the sixth lens when molding the sixth lens, thereby ensuring that the sixth lens may be molded into a large-diameter lens. More specifically, R11 and R12 may satisfy: 2.30<R11/R12<4.50.

In an exemplary embodiment, the camera lens group according to the present disclosure may satisfy: 1.00<R2/R3<2.50, where R2 is a radius of curvature of the image-side surface of the first lens, and R3 is a radius of curvature of the object-side surface of the second lens. When the camera lens group satisfies 1.00<R2/R3<2.50, the aberration contributed by the first lens and the aberration contributed by the second lens may compensate with each other, thereby correcting the chromatic aberration of the camera lens group and improving the image quality. More specifically, R2 and R3 may satisfy: 1.40<R2/R3<2.25.

In an exemplary embodiment, the camera lens group according to the present disclosure may satisfy: 29.00<CT5/T56<55.00, where CT5 is a center thickness of the fifth lens along the optical axis, and T56 is a spaced interval between the fifth lens and the sixth lens along the optical axis. When the camera lens group satisfies 29.00<CT5/T56<55.00, the positions of the fourth lens, the fifth lens and the sixth lens along the optical axis may be reasonably adjusted and the structure of the fifth lens may be controlled, which is beneficial to avoiding ghosting caused by reflection between the three lenses and avoiding ghosting caused by secondary reflection of the fifth lens. More specifically, CT5 and T56 may satisfy: 29.70<CT5/T56<54.80.

In an exemplary embodiment, the camera lens group according to the present disclosure may satisfy: 2.00<(CT3+CT1)/(CT3−CT1)<4.00, where CT1 is a center thickness of the first lens along the optical axis, and CT3 is a center thickness of the third lens along the optical axis. The camera lens group satisfies 2.00<(CT3+CT1)/(CT3−CT1)<4.00. On the one hand, the good processability of the camera lens group may be ensured. On the other hand, the aberration contributed by the first lens and the aberration contributed by the third lens may be compensated with each other to improve the image quality of the camera lens group. More specifically, CT1 and CT3 may satisfy: $2.70<(CT3+CT1)/(CT3-CT1)<3.70$.

In an exemplary embodiment, the camera lens group according to the present disclosure may satisfy: $0.50<(SAG41+SAG42)/(SAG41-SAG42)<3.00$, where SAG41 is an on-axis distance from an intersection of an object-side surface of the fourth lens and the optical axis to a vertex of an effective radius of the object-side surface of the fourth lens, and SAG42 is an on-axis distance from an intersection of an image-side surface of the fourth lens and the optical axis to a vertex of an effective radius of the image-side surface of the fourth lens. The camera lens group satisfies $0.50<(SAG41+SAG42)/(SAG41-SAG42)<3.00$, which is beneficial to controlling the curvature of the fourth lens to ensure that the fourth lens has good processability. More specifically, SAG41 and SAG42 may satisfy: $0.70<(SAG41+SAG42)/(SAG41-SAG42)<2.50$.

In an exemplary embodiment, the camera lens group according to the present disclosure may satisfy: $4.00<(DT61+DT62)/(DT62-DT61)<10.00$, where DT61 is a maximum effective radius of the object-side surface of the sixth lens, and DT62 is a maximum effective radius of the image-side surface of the sixth lens. The camera lens group satisfies $4.00<(DT61+DT62)/(DT62-DT61)<10.00$. On the one hand, the light inclination may be controlled to make the camera lens group and the imaging chip more matched. On the other hand, it is beneficial to ensure the processability of the sixth lens. More specifically, DT61 and DT62 may satisfy: $4.90<(DT61+DT62)/(DT62-DT61)<9.40$.

In an exemplary embodiment, the camera lens group according to the present disclosure may satisfy: $3.00<ET6/ET2<6.00$, where ET2 is an edge thickness of the second lens, and ET6 is an edge thickness of the sixth lens. The camera lens group satisfies $3.00<ET6/ET2<6.00$, which may improve assembly stability of the camera lens group while making the refractive power more reasonably assigned to each lens. More specifically, ET2 and ET6 may satisfy: $3.25<ET6/ET2<5.50$.

In an exemplary embodiment, the above camera lens group may further include at least one stop. The stop may be disposed at an appropriate position as required, for example, between the first lens and the second lens. Optionally, the above camera lens group may further include an optical filter for correcting the color deviation and/or a protective glass for protecting the photosensitive element located on an imaging plane.

The camera lens group according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the camera lens group may be effectively reduced, and the workability of the camera lens group may be improved, such that the camera lens group is more advantageous for production processing and may be applied to portable electronic products. At the same time, the camera lens group of the present disclosure also has excellent optical performance, such as wide angle, small distortion, high image quality and low ghost image intensity.

In the embodiments of the present disclosure, at least one of the surfaces of the lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking six lenses as an example, the camera lens group is not limited to include six lenses. The camera lens group may also include other numbers of lenses if desired.

Some specific examples of a camera lens group applicable to the above embodiment will be further described below with reference to the accompanying drawings.

EXAMPLE 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a first lens E1, a second lens E2, a stop STO, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is concave, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.8164 | 0.3303 | 1.55 | 56.1 | −4.76 | −88.6095 |
| S2 | Aspheric | 4.7851 | 0.7454 | | | | −1.0000 |
| S3 | Aspheric | 2.7178 | 0.2800 | 1.62 | 25.9 | 8.08 | −7.9899 |
| S4 | Aspheric | 5.7125 | 0.1155 | | | | −9.6591 |
| STO | Spherical | Infinite | 0.0375 | | | | |
| S5 | Aspheric | 7.1059 | 0.5787 | 1.55 | 56.1 | 3.38 | −6.9751 |
| S6 | Aspheric | −2.4184 | 0.3595 | | | | 2.2299 |
| S7 | Aspheric | −9.1399 | 0.2800 | 1.67 | 19.2 | −4.83 | 86.8527 |
| S8 | Aspheric | 5.1543 | 0.1000 | | | | −17.1956 |
| S9 | Aspheric | −58.8472 | 1.4808 | 1.55 | 56.1 | 1.64 | 90.0000 |
| S10 | Aspheric | −0.8909 | 0.0300 | | | | −1.3998 |
| S11 | Aspheric | 1.6303 | 0.5000 | 1.65 | 21.5 | −2.39 | −11.6012 |
| S12 | Aspheric | 0.7029 | 0.6844 | | | | −3.9428 |
| S13 | Spherical | Infinite | 0.2100 | 1.52 | 64.2 | | |
| S14 | Spherical | Infinite | 0.5649 | | | | |
| S15 | Spherical | Infinite | | | | | |

In example 1, a total effective focal length f of the camera lens group is 2.26 mm, an aperture number Fno of the camera lens group is 2.40, a distance TTL along the optical axis from the object-side surface S1 of the first lens E1 to the imaging plane S15 is 6.30 mm, half of a diagonal length ImgH of an effective pixel area on the imaging plane S15 is 4.20 mm, and half of a maximum field-of-view Semi-FOV is 66.5°.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1-(k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

FIG. 2A illustrates longitudinal aberration curves of the camera lens group according to example 1, representing the deviations of focal points converged by light of different wavelengths after passing through the lens group. FIG. 2B illustrates a lateral color curve of the camera lens group according to example 1, representing the deviations of different image heights on an imaging plane after light passes through the lens group. FIG. 2C illustrates astigmatic curves of the camera lens group according to example 1, representing the curvatures of a tangential plane and the curvatures of a sagittal plane. FIG. 2D illustrates a distortion curve of the camera lens group according to example 1, representing the amounts of distortion corresponding to different image heights. It can be seen from FIG. 2A to FIG. 2D that the camera lens group provided in example 1 may achieve good image quality.

EXAMPLE 2

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a first lens E1, a second lens E2, a stop STO, a third lens E3, a fourth lens E4, a fifth lens E5, a sixth lens E6 and an optical

TABLE 2

| Surface number | A4 | A6 | A8 | A10 | A12 | A14 | A16 | A18 | A20 |
|---|---|---|---|---|---|---|---|---|---|
| S1 | 1.5734E−01 | −1.0952E−01 | 5.9866E−02 | −2.3660E−02 | 6.4309E−03 | −1.1665E−03 | 1.3431E−04 | −8.8585E−06 | 2.5485E−07 |
| S2 | 2.3530E−01 | −1.0090E−01 | −5.5951E−02 | 1.6329E−01 | −1.5292E−01 | 7.4148E−02 | −1.9887E−02 | 2.8153E−03 | −1.6503E−04 |
| S3 | −2.2747E−02 | −2.9788E−02 | −5.8537E−01 | 2.5422E+00 | −6.6826E+00 | 1.1290E+01 | −1.1401E+01 | 6.2786E+00 | −1.4599E+00 |
| S4 | −1.4354E−02 | −1.4699E−01 | 7.0697E−01 | −3.0205E+00 | 8.4231E+00 | −1.1125E+01 | 3.0493E+00 | 7.9488E+00 | −6.1691E+00 |
| S5 | 6.8304E−03 | −7.0059E−02 | 5.6624E−01 | −4.0439E+00 | 1.6241E+01 | −3.9314E+01 | 5.0603E+01 | −2.7011E+01 | 0.0000E+00 |
| S6 | −1.1394E−01 | 1.5283E−02 | −4.5680E−01 | 2.5148E+00 | −1.0169E+01 | 2.5451E+01 | −3.8710E+01 | 3.2453E+01 | −1.1645E+01 |
| S7 | −3.5823E−01 | 3.6781E−01 | −1.5343E+00 | 4.8385E+00 | −1.0670E+01 | 1.4369E+01 | −1.0625E+01 | 3.2918E+00 | 0.0000E+00 |
| S8 | −2.4024E−01 | 1.6221E−01 | −9.0163E−03 | −1.2059E−01 | 1.4665E−01 | −8.5558E−02 | 2.5635E−02 | −3.0959E−03 | 0.0000E+00 |
| S9 | −1.3950E−02 | −1.6288E−01 | 4.2771E−01 | −5.3407E−01 | 4.0444E−01 | −1.9531E−01 | 5.9088E−02 | −1.0237E−02 | 7.7561E−04 |
| S10 | 1.7505E−01 | −2.9369E−01 | 3.1338E−01 | −2.5601E−01 | 1.5286E−01 | −6.1505E−02 | 1.5601E−02 | −2.2361E−03 | 1.3711E−04 |
| S11 | −3.2607E−03 | −3.9649E−02 | 2.5419E−02 | −8.2067E−03 | 1.5408E−03 | −1.7173E−04 | 1.0923E−05 | −3.4484E−07 | 3.3992E−09 |
| S12 | −3.8611E−02 | 6.2302E−03 | 1.0561E−04 | −2.4860E−04 | 4.5451E−05 | −3.8879E−06 | 1.6020E−07 | −1.9850E−09 | −3.4017E−11 | filter E7, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object- Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.9962 | 0.3641 | 1.55 | 56.1 | −4.41 | −90.0000 |
| S2 | Aspheric | 4.1089 | 0.8266 | | | | −1.0000 |
| S3 | Aspheric | 2.7886 | 0.2800 | 1.62 | 25.9 | 7.47 | −6.5664 |
| S4 | Aspheric | 6.7441 | 0.1511 | | | | −36.6688 |
| STO | Spherical | Infinite | 0.0282 | | | | |
| S5 | Aspheric | 5.6475 | 0.6628 | 1.55 | 56.1 | 3.61 | 9.0356 |
| S6 | Aspheric | −2.9074 | 0.3661 | | | | 0.2694 |
| S7 | Aspheric | −39.9687 | 0.2800 | 1.67 | 19.2 | −5.12 | 34.7425 |
| S8 | Aspheric | 3.8128 | 0.1000 | | | | −24.6884 |
| S9 | Aspheric | 140.0905 | 1.5871 | 1.55 | 56.1 | 1.66 | −90.0000 |
| S10 | Aspheric | −0.9066 | 0.0300 | | | | −1.4265 |
| S11 | Aspheric | 1.7260 | 0.5000 | 1.65 | 21.5 | −2.40 | −14.5862 |
| S12 | Aspheric | 0.7292 | 0.7049 | | | | −4.2299 |
| S13 | Spherical | Infinite | 0.2100 | 1.52 | 64.2 | | |
| S14 | Spherical | Infinite | 0.5648 | | | | |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 1.3053E−01 | −8.2904E−02 | 4.0334E−02 | −1.4200E−02 | 3.4605E−03 | −5.6660E−04 | 5.9426E−05 | −3.6100E−06 | 9.6683E−08 |
| S2 | 2.0359E−01 | −7.3308E−02 | −5.1449E−02 | 1.1765E−01 | −9.7312E−02 | 4.2284E−02 | −1.0206E−02 | 1.3021E−03 | −6.8823E−05 |
| S3 | −1.9366E−02 | −3.9113E−02 | −2.6101E−01 | 8.1552E−01 | −1.6890E+00 | 2.3788E+00 | −1.9536E+00 | 8.4392E−01 | −1.4952E−01 |
| S4 | −2.4776E−03 | −1.1831E−01 | 3.6879E−01 | −1.5315E+00 | 4.2764E+00 | −6.8273E+00 | 6.4964E+00 | −3.4333E+00 | 7.8616E−01 |
| S5 | 1.3456E−02 | −7.3764E−02 | 8.0322E−01 | −4.9028E+00 | 1.6650E+01 | −3.2480E+01 | 3.3557E+01 | −1.4279E+01 | 0.0000E+00 |
| S6 | −1.0039E−01 | −5.2865E−02 | 4.6139E−01 | −2.5347E+00 | 7.2443E+00 | −1.2404E+01 | 1.2527E+01 | −6.8639E+00 | 1.5441E+00 |
| S7 | −3.6156E−01 | 2.4916E−01 | −5.8963E−01 | 8.6731E−01 | −1.1710E+00 | 1.1514E+00 | −7.1599E−01 | 2.0785E−01 | 0.0000E+00 |
| S8 | −2.3514E−01 | 2.3998E−01 | −2.3127E−01 | 1.7896E−01 | −1.0380E−01 | 4.1598E−02 | −9.2823E−03 | 8.0760E−04 | 0.0000E+00 |
| S9 | −4.7165E−02 | −2.8708E−02 | 1.8589E−01 | −2.6960E−01 | 2.1198E−01 | −1.0201E−01 | 3.0112E−02 | −5.0122E−03 | 3.6027E−04 |
| S10 | 1.7016E−01 | −2.5492E−01 | 2.2600E−01 | −1.4357E−01 | 6.4033E−02 | −1.8499E−02 | 3.1985E−03 | −2.9328E−04 | 1.0647E−05 |
| S11 | 1.9827E−02 | −5.0961E−02 | 2.8064E−02 | −8.4312E−03 | 1.4816E−03 | −1.4734E−04 | 6.7219E−06 | 2.2451E−08 | −9.3918E−09 |
| S12 | −1.9569E−02 | −5.9267E−03 | 4.8249E−03 | −1.4489E−03 | 2.4669E−04 | −2.5778E−05 | 1.6407E−06 | −5.8518E−08 | 8.9764E−10 | side surface S5 thereof is convex, and an image-side surface S6 thereof is convex. The fourth lens E4 has negative refractive power, an object-side surface S7 thereof is concave, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

In example 2, a total effective focal length f of the camera lens group is 2.28 mm, an aperture number Fno of the camera lens group is 2.21, a distance TTL along the optical axis from the object-side surface S1 of the first lens E1 to the imaging plane S15 is 6.66 mm, half of a diagonal length ImgH of an effective pixel area on the imaging plane S15 is 4.20 mm, and half of a maximum field-of-view Semi-FOV is 66.0°.

FIG. 4A illustrates longitudinal aberration curves of the camera lens group according to example 2, representing the deviations of focal points converged by light of different wavelengths after passing through the lens group. FIG. 4B illustrates a lateral color curve of the camera lens group according to example 2, representing the deviations of different image heights on an imaging plane after light passes through the lens group. FIG. 4C illustrates astigmatic curves of the camera lens group according to example 2, representing the curvatures of a tangential plane and the curvatures of a sagittal plane. FIG. 4D illustrates a distortion curve of the camera lens group according to example 2, representing the amounts of distortion corresponding to different image heights. It can be seen from FIG. 4A to FIG. 4D that the camera lens group provided in example 2 may achieve good image quality.

EXAMPLE 3

A camera lens group according to example 3 of the present disclosure is described below with reference to FIG.

5 to FIG. 6D. FIG. 5 shows a schematic structural view of the camera lens group according to example 3 of the present disclosure.

As shown in FIG. 5, the camera lens group includes a first lens E1, a second lens E2, a stop STO, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

In example 3, a total effective focal length f of the camera lens group is 2.24 mm, an aperture number Fno of the camera lens group is 2.40, a distance TTL along the optical axis from the object-side surface S1 of the first lens E1 to the imaging plane S15 is 6.76 mm, half of a diagonal length ImgH of an effective pixel area on the imaging plane S15 is 4.20 mm, and half of a maximum field-of-view Semi-FOV is 66.9°.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −6.4874 | 0.3626 | 1.55 | 56.1 | −4.08 | −90.0000 |
| S2 | Aspheric | 3.4578 | 0.8766 | | | | −1.0000 |
| S3 | Aspheric | 2.9001 | 0.2800 | 1.62 | 25.9 | 8.99 | −6.2975 |
| S4 | Aspheric | 5.8269 | 0.1513 | | | | −16.2827 |
| STO | Spherical | Infinite | 0.0641 | | | | |
| S5 | Aspheric | 4.9400 | 0.6913 | 1.55 | 56.1 | 3.18 | 0.0682 |
| S6 | Aspheric | −2.5400 | 0.3872 | | | | 0.7062 |
| S7 | Aspheric | 32.9219 | 0.2800 | 1.67 | 19.2 | −5.15 | −90.0000 |
| S8 | Aspheric | 3.1426 | 0.1000 | | | | −16.4395 |
| S9 | Aspheric | 24.6047 | 1.6434 | 1.55 | 56.1 | 1.64 | −90.0000 |
| S10 | Aspheric | −0.9076 | 0.0300 | | | | −1.4433 |
| S11 | Aspheric | 1.8363 | 0.5000 | 1.65 | 21.5 | −2.21 | −19.9031 |
| S12 | Aspheric | 0.7228 | 0.6632 | | | | −4.4479 |
| S13 | Spherical | Infinite | 0.2100 | 1.52 | 64.2 | | |
| S14 | Spherical | Infinite | 0.5231 | | | | |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 1.3012E−01 | −8.0987E−02 | 3.8109E−02 | −1.3056E−02 | 3.1510E−03 | −5.1958E−04 | 5.5681E−05 | −3.4983E−06 | 9.7820E−08 |
| S2 | 1.9314E−01 | −5.7432E−02 | −4.4803E−02 | 8.6039E−02 | −6.0046E−02 | 2.1585E−02 | −4.0408E−03 | 3.4764E−04 | −8.1663E−06 |
| S3 | −2.5772E−02 | −6.4290E−02 | −7.1817E−02 | 3.0667E−01 | −8.2080E−01 | 1.5218E+00 | −1.5629E+00 | 8.2440E−01 | −1.7705E−01 |
| S4 | −8.4237E−03 | −9.0557E−02 | 3.6980E−01 | −1.7749E+00 | 5.4959E+00 | −9.6031E+00 | 9.7700E+00 | −5.3930E+00 | 1.2625E+00 |
| S5 | 1.2524E−02 | −7.5135E−02 | 4.9477E−01 | −2.6858E+00 | 8.3389E+00 | −1.5752E+01 | 1.6162E+01 | −7.1221E+00 | 0.0000E+00 |
| S6 | −1.0862E−01 | 6.3407E−02 | −5.2481E−01 | 2.3355E+00 | −7.5385E+00 | 1.5391E+01 | −1.9128E+01 | 1.3129E+01 | −3.8501E+00 |
| S7 | −3.5740E−01 | 2.6768E−01 | −7.3639E−01 | 1.4896E+00 | −2.4697E+00 | 2.6459E+00 | −1.6426E+00 | 4.5163E−01 | 0.0000E+00 |
| S8 | −2.0705E−01 | 1.5734E−01 | −7.1752E−02 | −1.1537E−02 | 3.6282E−02 | −2.1680E−02 | 6.7054E−03 | −8.9363E−04 | 0.0000E+00 |
| S9 | −2.0820E−02 | −1.1254E−01 | 3.1782E−01 | −4.0174E−01 | 2.9842E−01 | −1.3886E−01 | 3.9994E−02 | −6.5262E−03 | 4.6117E−04 |
| S10 | 1.9000E−01 | −2.7982E−01 | 2.3708E−01 | −1.4093E−01 | 5.8221E−02 | −1.5568E−02 | 2.4779E−03 | −2.0305E−04 | 5.9167E−06 |
| S11 | 1.9342E−01 | −6.6597E−02 | 3.8322E−02 | −1.1456E−02 | 1.8702E−03 | −1.4101E−04 | −1.6950E−06 | 1.0244E−06 | −5.0069E−08 |
| S12 | −2.4451E−02 | −6.1768E−03 | 5.5996E−03 | −1.7361E−03 | 3.0329E−04 | −3.2654E−05 | 2.1572E−06 | −8.0439E−08 | 1.2969E−09 |

Figures 6A, 6B:
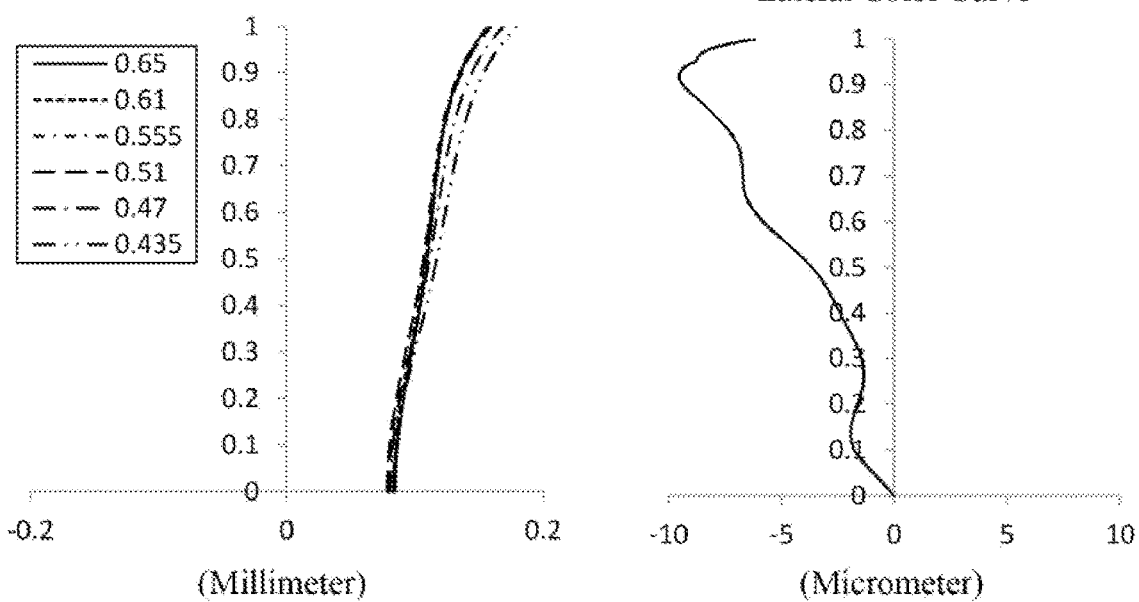

FIG. 6A illustrates longitudinal aberration curves of the camera lens group according to example 3, representing the deviations of focal points converged by light of different wavelengths after passing through the lens group. FIG. 6B illustrates a lateral color curve of the camera lens group according to example 3, representing the deviations of different image heights on an imaging plane after light passes through the lens group. FIG. 6C illustrates astigmatic curves of the camera lens group according to example 3, representing the curvatures of a tangential plane and the curvatures of a sagittal plane. FIG. 6D illustrates a distortion curve of the camera lens group according to example 3, representing the amounts of distortion corresponding to different image heights. It can be seen from FIG. 6A to FIG. 6D that the camera lens group provided in example 3 may achieve good image quality.

EXAMPLE 4

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a first lens E1, a second lens E2, a stop STO, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is concave, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

In example 4, a total effective focal length f of the camera lens group is 2.71 mm, an aperture number Fno of the camera lens group is 2.46, a distance TTL along the optical axis from the object-side surface S1 of the first lens E1 to the imaging plane S15 is 6.68 mm, half of a diagonal length ImgH of an effective pixel area on the imaging plane S15 is 4.20 mm, and half of a maximum field-of-view Semi-FOV is 57.2°.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.9204 | 0.3378 | 1.55 | 56.1 | −6.59 | −76.1845 |
| S2 | Aspheric | 9.3662 | 0.5896 | | | | −1.0000 |
| S3 | Aspheric | 4.5425 | 0.2800 | 1.62 | 25.9 | −45.38 | −5.4768 |
| S4 | Aspheric | 3.8183 | 0.1627 | | | | −5.7539 |
| STO | Spherical | Infinite | 0.0050 | | | | |
| S5 | Aspheric | 3.6125 | 0.7184 | 1.55 | 56.1 | 2.73 | −1.6890 |
| S6 | Aspheric | −2.3568 | 0.4725 | | | | −1.8279 |
| S7 | Aspheric | 10.7415 | 0.2800 | 1.67 | 19.2 | −6.57 | 72.3558 |
| S8 | Aspheric | 3.1136 | 0.3344 | | | | −5.9652 |
| S9 | Aspheric | 89.4532 | 1.4829 | 1.55 | 56.1 | 1.78 | 90.0000 |
| S10 | Aspheric | −0.9758 | 0.0498 | | | | −1.4180 |
| S11 | Aspheric | 1.9349 | 0.5111 | 1.65 | 21.5 | −2.17 | −10.9862 |
| S12 | Aspheric | 0.7346 | 0.6974 | | | | −3.5148 |
| S13 | Spherical | Infinite | 0.2100 | 1.52 | 64.2 | | |
| S14 | Spherical | Infinite | 0.5442 | | | | |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 1.4619E−01 | −1.0364E−01 | 7.0094E−02 | −3.7689E−02 | 1.5038E−02 | −4.2482E−03 | 7.9168E−04 | −8.6599E−05 | 4.1929E−06 |
| S2 | 2.2710E−01 | −1.6890E−01 | 1.7245E−01 | −1.7874E−01 | 1.5480E−01 | −9.6421E−02 | 3.6695E−02 | −7.4920E−03 | 6.3047E−04 |
| S3 | −4.5580E−02 | −4.8440E−02 | 4.9263E−03 | 7.0676E−02 | −1.6361E−01 | 2.9428E−01 | −2.9489E−01 | 1.4564E−01 | −2.8085E−02 |
| S4 | −1.0932E−02 | −9.1237E−02 | 5.8510E−01 | −2.8092E+00 | 9.1238E+00 | −1.7961E+01 | 2.1462E+01 | −1.4355E+01 | 4.1561E+00 |
| S5 | −1.9746E−03 | −2.1388E−02 | −1.1649E−02 | 1.6906E−01 | −6.8291E−01 | 1.2001E+00 | −1.0028E+00 | 3.1082E−01 | 0.0000E+00 |
| S6 | −9.4074E−02 | 6.9089E−02 | −4.0426E−01 | 1.3868E+00 | −3.3265E+00 | 5.1586E+00 | −4.9309E+00 | 2.6346E+00 | −6.0481E−01 |

TABLE 8-continued

| Surface number | A4 | A6 | A8 | A10 | A12 | A14 | A16 | A18 | A20 |
|---|---|---|---|---|---|---|---|---|---|
| S7 | −2.6115E−01 | 2.3995E−01 | −3.5718E−01 | 2.6606E−01 | 2.4716E−02 | −2.2479E−01 | 1.6561E−01 | −3.9330E−02 | 0.0000E+00 |
| S8 | −2.1685E−01 | 2.8124E−01 | −3.3936E−01 | 3.0723E−01 | −1.8638E−01 | 7.1158E−02 | −1.5333E−02 | 1.4162E−03 | 0.0000E+00 |
| S9 | −4.9669E−02 | 1.0661E−02 | 5.9077E−03 | 1.0533E−02 | −2.6177E−02 | 2.1918E−02 | −9.3194E−03 | 2.0341E−03 | −1.8253E−04 |
| S10 | 1.7217E−01 | −2.9411E−01 | 3.2922E−01 | −2.7241E−01 | 1.5885E−01 | −6.1881E−02 | 1.5136E−02 | −2.0758E−03 | 1.2056E−04 |
| S11 | −6.0372E−02 | −3.8801E−04 | 7.7830E−03 | −1.8910E−03 | −4.4640E−04 | 3.1058E−04 | −6.5124E−05 | 6.3483E−06 | −2.4478E−07 |
| S12 | −6.2282E−02 | 2.0941E−02 | −4.8466E−03 | 7.6300E−04 | −8.5178E−05 | 6.9286E−06 | −4.0655E−07 | 1.5534E−08 | −2.8422E−10 |

FIG. 8A illustrates longitudinal aberration curves of the camera lens group according to example 4, representing the deviations of focal points converged by light of different wavelengths after passing through the lens group. FIG. 8B illustrates a lateral color curve of the camera lens group according to example 4, representing the deviations of different image heights on an imaging plane after light passes through the lens group. FIG. 8C illustrates astigmatic curves of the camera lens group according to example 4, representing the curvatures of a tangential plane and the curvatures of a sagittal plane. FIG. 8D illustrates a distortion curve of the camera lens group according to example 4, representing the amounts of distortion corresponding to different image heights. It can be seen from FIG. 8A to FIG. 8D that the camera lens group provided in example 4 may achieve good image quality.

EXAMPLE 5

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a first lens E1, a second lens E2, a stop STO, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

In example 5, a total effective focal length f of the camera lens group is 2.41 mm, an aperture number Fno of the camera lens group is 2.26, a distance TTL along the optical axis from the object-side surface S1 of the first lens E1 to the imaging plane S15 is 6.65 mm, half of a diagonal length ImgH of an effective pixel area on the imaging plane S15 is 4.20 mm, and half of a maximum field-of-view Semi-FOV is 65.1°.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1 | Aspheric | −5.9809 | 0.3969 | 1.55 | 56.1 | −4.38 | −74.2415 |
| S2 | Aspheric | 4.0826 | 0.8465 | | | | −1.0000 |
| S3 | Aspheric | 2.5420 | 0.2800 | 1.62 | 25.9 | 8.02 | −4.0021 |
| S4 | Aspheric | 4.9853 | 0.1429 | | | | −3.1240 |
| STO | Spherical | Infinite | 0.1032 | | | | |
| S5 | Aspheric | 4.6734 | 0.8557 | 1.55 | 56.1 | 4.21 | 8.7942 |
| S6 | Aspheric | −4.2393 | 0.1672 | | | | 6.0962 |
| S7 | Aspheric | 6.6511 | 0.2800 | 1.67 | 19.2 | 351.94 | 34.5162 |
| S8 | Aspheric | 6.7256 | 0.3076 | | | | 2.4655 |
| S9 | Aspheric | 19.2468 | 1.4208 | 1.55 | 56.1 | 1.95 | 77.0936 |
| S10 | Aspheric | −1.0992 | 0.0300 | | | | −1.4594 |
| S11 | Aspheric | 4.0268 | 0.6087 | 1.65 | 21.5 | −1.92 | −90.0000 |
| S12 | Aspheric | 0.9012 | 0.5701 | | | | −4.9276 |
| S13 | Spherical | Infinite | 0.2100 | 1.52 | 64.2 | | |
| S14 | Spherical | Infinite | 0.4300 | | | | |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 1.2512E−01 | −7.4990E−02 | 3.5399E−02 | −1.2032E−02 | 2.8094E−03 | −4.3669E−04 | 4.2911E−05 | −2.3987E−06 | 5.7748E−08 |
| S2 | 1.8974E−01 | −4.8046E−02 | −7.9711E−02 | 1.4294E−01 | −1.1271E−01 | 4.8125E−02 | −1.1522E−02 | 1.4633E−03 | −7.7097E−05 |
| S3 | −1.5442E−02 | 8.3513E−03 | −4.3456E−01 | 1.3439E+00 | −2.6402E+00 | 3.3485E+00 | −2.5001E+00 | 9.9575E−01 | −1.6409E−01 |
| S4 | 1.2611E−02 | −2.1084E−01 | 1.1798E+00 | −5.4075E+00 | 1.5927E+01 | −2.9059E+01 | 3.2403E+01 | −2.0109E+01 | 5.2927E+00 |
| S5 | 1.1194E−02 | −5.8032E−02 | 3.9031E−01 | −1.5392E+00 | 3.4335E+00 | −4.3925E+00 | 2.9103E+00 | −7.5572E−01 | 0.0000E+00 |
| S6 | −1.6363E−01 | −9.9889E−02 | 3.8960E−01 | −7.2639E−01 | 6.8080E−01 | −1.3599E−01 | −2.9581E−01 | 2.3336E−01 | −5.0040E−02 |
| S7 | −2.1284E−01 | −1.7339E−01 | 5.0566E−02 | 4.0602E−01 | −1.0070E+00 | 1.0867E+00 | −5.9390E−01 | 1.3629E−01 | 0.0000E+00 |
| S8 | −3.9623E−02 | −2.1661E−01 | 3.2144E−01 | −2.2153E−01 | 6.3235E−02 | 1.0304E−02 | −1.0805E−02 | 1.9989E−03 | 0.0000E+00 |
| S9 | 1.0603E−02 | −6.0782E−02 | 3.5363E−02 | 3.4181E−02 | −6.1975E−02 | 4.0473E−02 | −1.4235E−02 | 2.6718E−03 | −2.0858E−04 |
| S10 | 1.6961E−01 | −2.4194E−01 | 2.1619E−01 | −1.4310E−01 | 7.0459E−02 | −2.3307E−02 | 4.6968E−03 | −5.1546E−04 | 2.3674E−05 |
| S11 | −8.5479E−02 | −2.1372E−02 | 1.8119E−02 | 2.4469E−03 | −4.8657E−03 | 1.6961E−03 | −2.8267E−04 | 2.4118E−05 | −8.6326E−07 |
| S12 | −7.1137E−02 | 2.7388E−02 | −8.1394E−03 | 1.8765E−03 | −3.2354E−04 | 3.8315E−05 | −2.8658E−06 | 1.2082E−07 | −2.1839E−09 |

FIG. 10A illustrates longitudinal aberration curves of the camera lens group according to example 5, representing the deviations of focal points converged by light of different wavelengths after passing through the lens group. FIG. 10B illustrates a lateral color curve of the camera lens group according to example 5, representing the deviations of different image heights on an imaging plane after light passes through the lens group. FIG. 10C illustrates astigmatic curves of the camera lens group according to example 5, representing the curvatures of a tangential plane and the curvatures of a sagittal plane. FIG. 10D illustrates a distortion curve of the camera lens group according to example 5, representing the amounts of distortion corresponding to different image heights. It can be seen from FIG. 10A to FIG. 10D that the camera lens group provided in example 5 may achieve good image quality.

EXAMPLE 6

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a first lens E1, a second lens E2, a stop STO, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is concave, and an image-side surface S8 thereof is convex. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens group has an imaging plane S15, and light from an object sequentially passes through the respective surfaces S1 to S14 and is finally imaged on the imaging plane S15.

In example 6, a total effective focal length f of the camera lens group is 2.38 mm, an aperture number Fno of the camera lens group is 2.30, an on-axis distance TTL from the object-side surface S1 of the first lens E1 to the imaging plane S15 is 6.34 mm, half of a diagonal length ImgH of an effective pixel area on the imaging plane S15 is 4.20 mm, and half of a maximum field-of-view Semi-FOV is 64.1°.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | −5.7350 | 0.3503 | 1.55 | 56.1 | −5.09 | −79.1625 |
| S2 | Aspheric | 5.5009 | 0.7447 | | | | −1.0000 |
| S3 | Aspheric | 2.4892 | 0.2800 | 1.62 | 25.9 | 6.81 | −6.6810 |
| S4 | Aspheric | 5.8102 | 0.1432 | | | | −54.7003 |
| STO | Spherical | Infinite | 0.0240 | | | | |
| S5 | Aspheric | 5.4094 | 0.6510 | 1.55 | 56.1 | 3.62 | 4.0074 |
| S6 | Aspheric | −2.9782 | 0.3257 | | | | 2.1687 |
| S7 | Aspheric | −6.7670 | 0.2800 | 1.67 | 19.2 | −10.72 | 48.0143 |
| S8 | Aspheric | −101.1367 | 0.1000 | | | | 62.9164 |
| S9 | Aspheric | −3.5453 | 1.4015 | 1.55 | 56.1 | 1.80 | −45.6243 |
| S10 | Aspheric | −0.8780 | 0.0300 | | | | −1.4108 |

TABLE 11-continued

| Surface number | Surface type | Radius of curvature | Thickness/ Distance | Material Refractive index | Abbe number | Focal length | Conic coefficient |
|---|---|---|---|---|---|---|---|
| S11 | Aspheric | 1.9305 | 0.5611 | 1.65 | 21.5 | −2.34 | −19.4045 |
| S12 | Aspheric | 0.7561 | 0.6902 | | | | −4.5875 |
| S13 | Spherical | Infinite | 0.2100 | 1.52 | 64.2 | | |
| S14 | Spherical | Infinite | 0.5525 | | | | |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 1.3578E−01 | −8.7228E−02 | 4.3936E−02 | −1.6053E−02 | 4.0996E−03 | −7.1376E−04 | 8.1074E−05 | −5.4637E−06 | 1.6683E−07 |
| S2 | 2.0684E−01 | −8.6779E−02 | −3.4474E−02 | 1.0101E−01 | −8.5789E−02 | 3.7450E−02 | −9.0387E−03 | 1.1519E−03 | −6.0811E−05 |
| S3 | −6.0098E−03 | −1.0697E−01 | 2.6831E−02 | −1.3394E−01 | 1.8653E−01 | 1.3955E−01 | −3.5380E−01 | 2.1322E−01 | −4.3895E−02 |
| S4 | −1.7634E−03 | −8.1511E−02 | −3.1133E−02 | 5.0721E−02 | 4.2187E−01 | −7.2691E−01 | 3.5474E−01 | 1.2368E−01 | −1.1557E−01 |
| S5 | 1.1629E−02 | −1.2612E−01 | 1.5340E+00 | −1.0738E+01 | 4.1960E+01 | −9.3976E+01 | 1.1138E+02 | −5.4390E+01 | 0.0000E+00 |
| S6 | −9.1341E−02 | −1.4341E−01 | 5.7408E−01 | −2.1423E+00 | 4.5950E+00 | −5.7586E+00 | 3.2301E+00 | 1.9033E−01 | −7.5345E−01 |
| S7 | −1.7193E−01 | −3.7559E−01 | 4.1550E−01 | 1.4042E+00 | −7.0819E+00 | 1.2712E+01 | −1.0874E+01 | 3.6811E+00 | 0.0000E+00 |
| S8 | 8.2106E−02 | −7.6033E−01 | 1.7627E+00 | −2.4324E+00 | 2.1361E+00 | −1.1615E+00 | 3.5540E−01 | −4.6470E−02 | 0.0000E+00 |
| S9 | 9.0702E−02 | −4.2168E−01 | 8.0917E−01 | −7.9730E−01 | 3.5365E−01 | 3.0870E−02 | −1.0651E−01 | 4.3779E−02 | −6.0469E−03 |
| S10 | 1.6743E−01 | −2.4930E−01 | 2.2289E−01 | −1.5740E−01 | 8.8835E−02 | −3.5906E−02 | 9.4272E−03 | −1.4317E−03 | 9.5349E−05 |
| S11 | 3.1184E−02 | −6.5068E−02 | 3.9905E−02 | −1.4321E−02 | 3.2814E−03 | −4.8700E−04 | 4.5451E−05 | −2.4271E−06 | 5.6537E−08 |
| S12 | −1.9042E−02 | −3.7221E−03 | 3.4707E−03 | −1.0738E−03 | 1.8736E−04 | −2.0042E−05 | 1.3014E−06 | −4.7070E−08 | 7.2662E−10 |

Figures 12A, 12B:
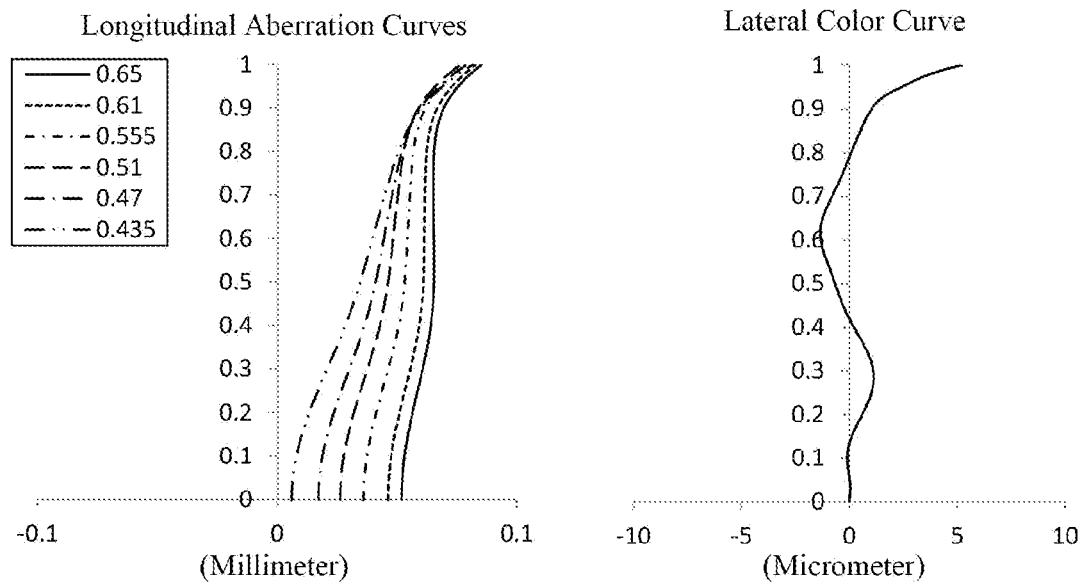
FIGS. 12A to 12D illustrate longitudinal aberration curves, a lateral color curve, astigmatic curves, and a distortion curve of the camera lens group of the example 6, respectively.
Figures 12C, 12D:
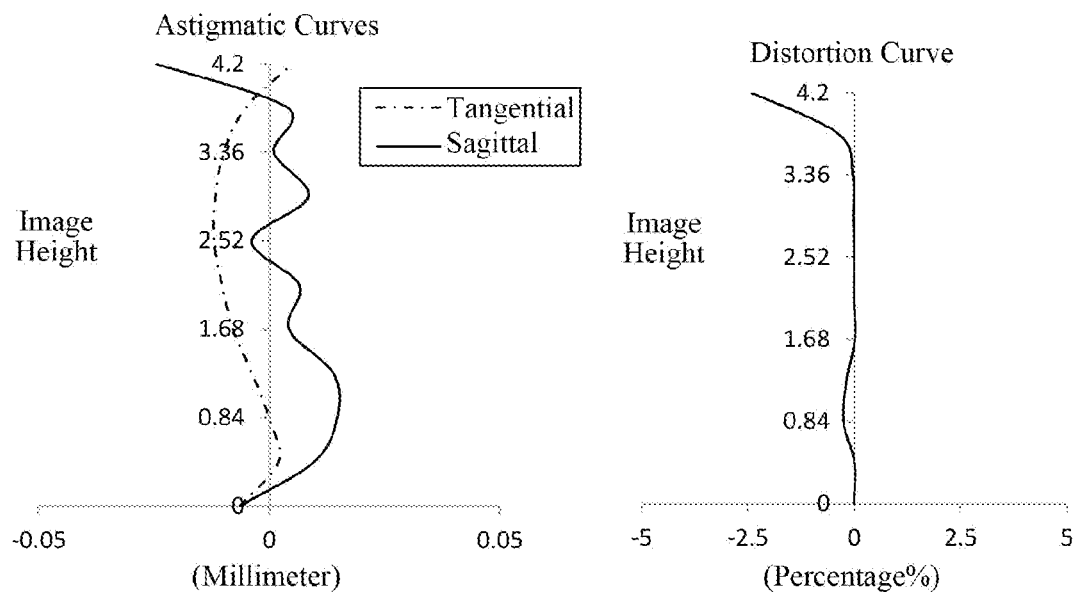

FIG. 12A illustrates longitudinal aberration curves of the camera lens group according to example 6, representing the deviations of focal points converged by light of different wavelengths after passing through the lens group. FIG. 12B illustrates a lateral color curve of the camera lens group according to example 6, representing the deviations of different image heights on an imaging plane after light passes through the lens group. FIG. 12C illustrates astigmatic curves of the camera lens group according to example 6, representing the curvatures of a tangential plane and the curvatures of a sagittal plane. FIG. 12D illustrates a distortion curve of the camera lens group according to example 6, representing the amounts of distortion corresponding to different image heights. It can be seen from FIG. 12A to FIG. 12D that the camera lens group provided in example 6 may achieve good image quality.

In view of the above, examples 1 to 6 respectively satisfy the relationship shown in Table 13.

TABLE 13

| Conditional/Example | 1 | 2 | 3 | 4 | 5 | 6 |
|---|---|---|---|---|---|---|
| $\tan^2(\text{Semi-FOV})\ast\text{ImgH}$ | 22.17 | 21.18 | 23.07 | 10.08 | 19.56 | 17.81 |
| TTL/ImgH | 1.50 | 1.58 | 1.61 | 1.59 | 1.58 | 1.51 |
| f1/f6 | 1.99 | 1.84 | 1.85 | 3.04 | 2.29 | 2.18 |
| f34/BFL | 5.55 | 5.75 | 4.34 | 2.60 | 3.39 | 3.53 |
| R11/R12 | 2.32 | 2.37 | 2.54 | 2.63 | 4.47 | 2.55 |
| R2/R3 | 1.76 | 1.47 | 1.19 | 2.06 | 1.61 | 2.21 |
| CT5/T56 | 49.36 | 52.90 | 54.78 | 29.75 | 47.36 | 46.72 |
| (CT3 + CT1)/(CT3 − CT1) | 3.66 | 3.44 | 3.21 | 2.78 | 2.73 | 3.33 |
| (SAG41 + SAG42)/(SAG41 − SAG42) | 1.97 | 1.86 | 1.54 | 0.79 | 1.85 | 2.47 |
| (DT61 + DT62)/(DT62 − DT61) | 9.32 | 7.67 | 6.77 | 6.35 | 4.93 | 8.61 |
| ET6/ET2 | 3.78 | 4.09 | 4.22 | 3.29 | 5.48 | 4.04 |
| Maximum Distortion | −2.93% | −2.71% | −3.25% | −1.80% | −1.80% | −2.40% |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the present disclosure, such as, technical solutions formed by replacing the features as disclosed in the present disclosure with (but not limited to), technical features with similar functions.

What is claimed is:
1. A camera lens group, sequentially from an object side to an image side of the camera lens group along an optical axis, comprising:

a first lens having negative refractive power, a concave object-side surface and a concave image-side surface;
a second lens having refractive power, a convex object-side surface and a concave image-side surface;
a third lens having positive refractive power, a convex object-side surface and a convex image-side surface;
a fourth lens having refractive power;
a fifth lens having positive refractive power and a convex image-side surface; and
a sixth lens having negative refractive power, a convex object-side surface and a concave image-side surface,
wherein 10.00 mm<$\tan^2$(Semi-FOV)*ImgH<23.50 mm, where Semi-FOV is half of a field-of-view of the camera lens group, and ImgH is half of a diagonal length of an effective pixel area on an imaging plane of the camera lens group; and
a maximum distortion of the camera lens group is less than 0 and more than −3.50%.

2. The camera lens group according to claim 1, wherein TTL/ImgH≤1.61,
where TTL is a distance along the optical axis from the object-side surface of the first lens to the imaging plane of the camera lens group, and ImgH is half of the diagonal length of the effective pixel area on the imaging plane.

3. The camera lens group according to claim 1, wherein 1.50<f1/f6<3.50,
where f1 is an effective focal length of the first lens, and f6 is an effective focal length of the sixth lens.

4. The camera lens group according to claim 1, wherein 2.00<f34/BFL<6.00,
where f34 is a combined focal length of the third lens and the fourth lens, and BFL is a distance from the image-side surface of the sixth lens to the imaging plane of the camera lens group along the optical axis.

5. The camera lens group according to claim 1, wherein 2.00<R11/R12<5.00,
where R11 is a radius of curvature of the object-side surface of the sixth lens, and R12 is a radius of curvature of the image-side surface of the sixth lens.

6. The camera lens group according to claim 1, wherein 1.00<R2/R3<2.50,
where R2 is a radius of curvature of the image-side surface of the first lens, and R3 is a radius of curvature of the object-side surface of the second lens.

7. The camera lens group according to claim 1, wherein 29.00<CT5/T56<55.00,
where CT5 is a center thickness of the fifth lens along the optical axis, and T56 is a spaced interval between the fifth lens and the sixth lens along the optical axis.

8. The camera lens group according to claim 1, wherein 2.00< (CT3+CT1)/(CT3−CT1)<4.00,
where CT1 is a center thickness of the first lens along the optical axis, and CT3 is a center thickness of the third lens along the optical axis.

9. The camera lens group according to claim 1, wherein 0.50< (SAG41+SAG42)/(SAG41−SAG42)<3.00,
where SAG41 is an on-axis distance from an intersection of an object-side surface of the fourth lens and the optical axis to a vertex of an effective radius of the object-side surface of the fourth lens, and SAG42 is an on-axis distance from an intersection of an image-side surface of the fourth lens and the optical axis to a vertex of an effective radius of the image-side surface of the fourth lens.

10. The camera lens group according to claim 1, wherein 4.00< (DT61+DT62)/(DT62−DT61)<10.00,
where DT61 is a maximum effective radius of the object-side surface of the sixth lens, and DT62 is a maximum effective radius of the image-side surface of the sixth lens.

11. The camera lens group according to claim 1, wherein 3.00<ET6/ET2<6.00,
where ET2 is an edge thickness of the second lens, and ET6 is an edge thickness of the sixth lens.

12. The camera lens group according to claim 1, wherein the maximum distortion of the camera lens group satisfies: −3.25%≤ the maximum distortion≤−1.80%.

13. A camera lens group, sequentially from an object side to an image side of the camera lens group along an optical axis, comprising:
a first lens having negative refractive power, a concave object-side surface and a concave image-side surface;
a second lens having refractive power, a convex object-side surface and a concave image-side surface;
a third lens having positive refractive power, a convex object-side surface and a convex image-side surface;
a fourth lens having refractive power;
a fifth lens having positive refractive power and a convex image-side surface; and
a sixth lens having negative refractive power, a convex object-side surface and a concave image-side surface,
wherein 2.00<(CT3+CT1)/(CT3−CT1)<4.00, where CT1 is a center thickness of the first lens along the optical axis, and CT3 is a center thickness of the third lens along the optical axis; and
a maximum distortion of the camera lens group is less than 0 and more than −3.50%;
wherein TTL/ImgH≤1.61,
where TTL is a distance along the optical axis from the object-side surface of the first lens to an imaging plane of the camera lens group, and ImgH is half of a diagonal length of an effective pixel area on the imaging plane.

14. The camera lens group according to claim 13, wherein 1.50<f1/f6<3.50,
where f1 is an effective focal length of the first lens, and f6 is an effective focal length of the sixth lens.

15. The camera lens group according to claim 13, wherein 2.00<f34/BFL<6.00,
where f34 is a combined focal length of the third lens and the fourth lens, and BFL is a distance from the image-side surface of the sixth lens to an imaging plane of the camera lens group along the optical axis.

16. The camera lens group according to claim 13, wherein 2.00<R11/R12<5.00,
where R11 is a radius of curvature of the object-side surface of the sixth lens, and R12 is a radius of curvature of the image-side surface of the sixth lens.

17. The camera lens group according to claim 13, wherein 1.00<R2/R3<2.50,
where R2 is a radius of curvature of the image-side surface of the first lens, and R3 is a radius of curvature of the object-side surface of the second lens.

18. The camera lens group according to claim 13, wherein 29.00<CT5/T56<55.00,
where CT5 is a center thickness of the fifth lens along the optical axis, and T56 is a spaced interval between the fifth lens and the sixth lens along the optical axis.

19. The camera lens group according to claim 18, wherein 10.00 mm<$\tan^2$(Semi-FOV)*ImgH<23.50 mm,
where Semi-FOV is half of a field-of-view of the camera lens group, and ImgH is half of a diagonal length of an effective pixel area on an imaging plane of the camera lens group.

20. The camera lens group according to claim 13, wherein 0.50< (SAG41+SAG42)/(SAG41−SAG42)<3.00,
where SAG41 is an on-axis distance from an intersection of an object-side surface of the fourth lens and the optical axis to a vertex of an effective radius of the object-side surface of the fourth lens, and SAG42 is an on-axis distance from an intersection of an image-side surface of the fourth lens and the optical axis to a vertex of an effective radius of the image-side surface of the fourth lens.

\* \* \* \* \*